United States Patent
Ozkul et al.

(10) Patent No.: US 9,126,700 B2
(45) Date of Patent: Sep. 8, 2015

(54) AUTONOMOUS DECISION SYSTEM FOR SELECTING TARGET IN OBSERVATION SATELLITES

(75) Inventors: Tarik Ozkul, Istabul (TR); Suhail Aldhafri, Dubai (AE)

(73) Assignee: Tarik Ozkul, Istanbul (TR)

( * ) Notice: Subject to any disclaimer, the term of this patent is extended or adjusted under 35 U.S.C. 154(b) by 670 days.

(21) Appl. No.: 13/320,924

(22) PCT Filed: Jan. 25, 2010

(86) PCT No.: PCT/IB2010/050311
§ 371 (c)(1),
(2), (4) Date: Nov. 17, 2011

(87) PCT Pub. No.: WO2011/089477
PCT Pub. Date: Jul. 28, 2011

(65) Prior Publication Data
US 2012/0188372 A1     Jul. 26, 2012

(51) Int. Cl.
| | |
|---|---|
| H04N 7/18 | (2006.01) |
| B64G 1/10 | (2006.01) |
| B64G 1/36 | (2006.01) |
| G05D 1/00 | (2006.01) |
| G05D 3/00 | (2006.01) |
| G06F 7/00 | (2006.01) |
| G06F 17/00 | (2006.01) |
| G03B 15/00 | (2006.01) |
| G01C 11/02 | (2006.01) |

(52) U.S. Cl.
CPC .............. *B64G 1/1021* (2013.01); *G01C 11/02* (2013.01); *G03B 15/006* (2013.01); *B64G 2001/1028* (2013.01)

(58) Field of Classification Search
None
See application file for complete search history.

(56) References Cited

U.S. PATENT DOCUMENTS

| | | | | |
|---|---|---|---|---|
| 5,353,055 A | * | 10/1994 | Hiramatsu | 348/145 |
| 5,798,786 A | * | 8/1998 | Lareau et al. | 348/144 |
| 5,894,323 A | * | 4/1999 | Kain et al. | 348/116 |
| 7,424,133 B2 | * | 9/2008 | Schultz et al. | 382/106 |
| 8,155,433 B2 | * | 4/2012 | Chien | 382/154 |

(Continued)

FOREIGN PATENT DOCUMENTS

| | | |
|---|---|---|
| DE | 102004024595 B3 | 8/2005 |
| DE | 102005010155 A1 | 9/2006 |
| JP | 2001-122199 A | 5/2001 |

OTHER PUBLICATIONS

Beaumet et al. "Decision-Making on board an Autonomous Agile Earth Observing Satellite" International Conference on Automated Planning and Scheduling, ICAPS'08, Workshop on Scheduling and Planning Applications, 17-18, 2008.*

(Continued)

*Primary Examiner* — Joseph Ustaris
*Assistant Examiner* — Rebecca Volentine
(74) *Attorney, Agent, or Firm* — Cesari and McKenna, LLP

(57) ABSTRACT

The invention uses plurality of forward-looking preview cameras each looking at different nadir angle viewpoint to get cloud information from approaching target areas. The invention uses fuzzy logic system and other decision mechanisms to decide which target images should be acquired in which particular sequence and when the target image acquisition should start. The invention intends to give autonomous decision capability to agile earth observation satellites to make decision on their own to get the highest yield of quality images of target areas.

8 Claims, 7 Drawing Sheets

(56) References Cited

U.S. PATENT DOCUMENTS

| | | | | |
|---|---|---|---|---|
| 2002/0121574 | A1* | 9/2002 | Davis | 244/171 |
| 2004/0158832 | A1* | 8/2004 | Chechik et al. | 718/102 |
| 2005/0071054 | A1* | 3/2005 | Weiner | 701/13 |
| 2006/0017816 | A1* | 1/2006 | Gat | 348/208.99 |
| 2006/0077255 | A1* | 4/2006 | Cheng | 348/143 |
| 2006/0132753 | A1 | 6/2006 | Nichols et al. | |
| 2009/0256909 | A1* | 10/2009 | Nixon | 348/144 |

OTHER PUBLICATIONS

Algra, Theo, "Real-time Cloud Sensing for Efficiency Improvement of Optical High-resolution Satellite Remote Sensing," Geoscience and Remote Sensing Symposium, 7,21-25, IEEE, 2003, pp. 4311-4313.

Bissolli, P., "Construction of a Cloud Cover Reference Climatology Using Satellite and in Situ Data for the Climate Monitoring Programme SAT-KLIM of the German Meteorological Service," Proceedings of the 2003 EUMETSAT Meteorological Satellite Conference Weimar, Germany, 2003, pp. 1-7.

Maier, Ute, et al., "SAT-KLIM: Using Satellite-Derived Cloud Products for Operational Climate Monitoring," Proceedings of EUMETSAT Meteorological Satellite Conference, 2009, pp. 1-8.

Tatem, Andrew J., et al., "Fifty Years of Earth-Observation Satellites," American Scientist, vol. 96, Sep.-Oct. 2008, pp. 390-398.

"A Day in the Life of an Order . . . , " Power Point Presentation, Training Team, DigitalGlobe, Apr. 12, 2004, pp. 1-15.

"DigitalGlobe WorldView-1 Instrument / Product Descriptions," DigitalGlobe, Jun. 10, 2009, pp. 1-13.

"Weather Source, Historical Weather Data Products and Services," <http:/weather-source.com/prodservices.html> as of Dec. 18, 2008, retrieved on Feb. 17, 2015, pp. 1-4.

"WorldView-1 Product Quick Reference Guide," Version 1.2, DigitalGlobe, Nov. 3, 2008, pp. 1-13.

* cited by examiner

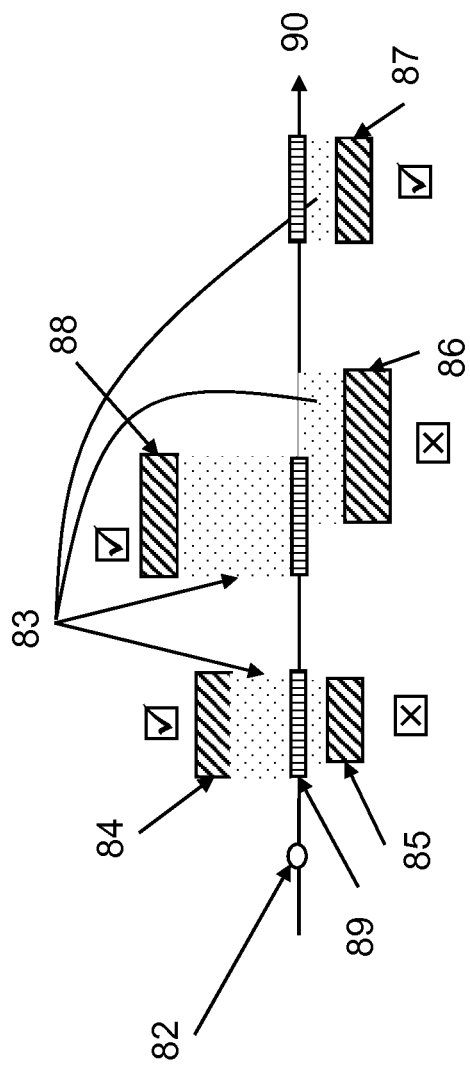
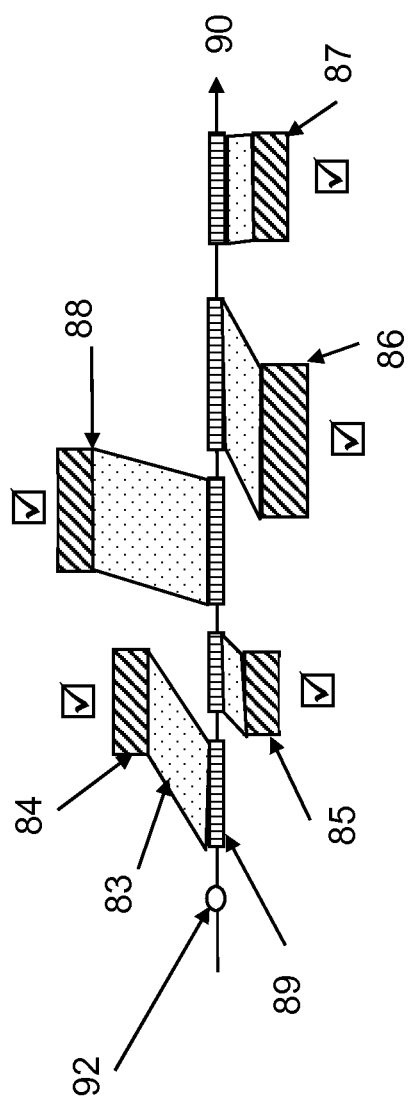

AUTONOMOUS DECISION SYSTEM FOR SELECTING TARGET IN OBSERVATION SATELLITES

CROSS REFERENCE TO RELATED APPLICATIONS

This application is the national stage entry under 35 USC 371 for PCT/IB2010/050311, filed Jan. 25, 2010. The contents of the foregoing application is incorporated by reference.

FIELD

The present invention relates to category of "Cosmonautical equipment". It further relates to subcategory of "Guidance or controlling apparatus" and further relates to subcategory of "Arrangement or adaptation of instruments for use in satellites." The device is intended to be used in satellites and imaging crafts and aims to make satellite controller to make autonomous decision for efficient operation of earth observation satellites.

BACKGROUND

Earth-observation satellites intend to image target areas of earth under clear sky conditions. The satellites that are designed for earth observation purposes are typically placed in a lower orbit than other satellites. Typical orbit altitude for this type of satellites is around 450 km. Due to space mechanics involved; any satellite located at such a low orbit has to revolve around earth much faster than the rotation of the Earth itself. Typical orbit time for such satellites is about 90 minutes which means that satellite will be completing it is rotation over earth every 90 minutes. Orbit inclination is an important factor, which determines whether the satellite will be orbiting the same path or visiting different paths as it revolves around globe. Satellites with orbit inclination 0° rotate over the equator all the time without going over any other location. Satellites with orbit inclination 45° go over areas of northern and southern hemisphere of Earth between 45° latitude. Satellites with orbit inclination 90° or more can fly over any part of the earth. Typically, this is what most commercial earth-observation satellites desire since they need the capability to image any part of the earth desired by their clientele. Most Earth observation satellites also fly in a "sun-synchronous orbit" which means that satellites will be going over the same spot always at the same local time. This is important for earth observation missions since existence of daylight is necessary for imaging purposes. Orbital mechanics of observation satellites is well known in practice and literature. A good source for this type of information is a book titled "Satellite Orbits: Models, Methods and Applications" by Montenbruck and Gill published in year 2000.

Due to low orbit altitude, observation satellites revolve around earth at a fast rate of 90 minute orbit time to complete a whole rotation around earth. This corresponds to enormous ground of speed of 7 km/sec or 25200 km/hr. Earth-observation satellites revolve around earth in a peculiar spiraling orbit flying over different path which is displaced few thousand kilometers from the previous path. This way, satellite revisits to the exact same spot on earth more or less in every four days.

Earth observation satellites are designed to image target areas selected by clients as they fly over the target. An image of target area with excessive cloud cover is undesirable since it obscures the details of the image. If a client requires image of a certain target area, and if that area happens to be under cloud cover at the time satellite passes over the target area, another imaging attempt has to be done at another scheduled visit. Observation satellites cannot hover over the target area waiting for cloud condition to clear, therefore, another attempt has to be done when satellite is scheduled to fly over the target area again which means few days of delay.

Observation satellites fly with high ground speed, which is about 7 km/sec. Therefore, earth observation satellite has only few second time windows over the target area, which needs to be used very efficiently. What complicates the issue further, during these few second duration window of observation, there may multiple target areas that need to be imaged. Imaging these targets require aiming main imaging instrument of the satellite toward the target area. This process is not instantaneous and requires time. Current state of the art in observation satellites is a category of satellites called "agile" satellites, which can control satellite attitude along the three axes (roll, pitch and yaw) via gyroscopic actuators. This capability allows the satellite to perform observations and transitions between observations during its flight. In other words, unlike non-agile satellites, which stand still and wait for the target area to appear under the satellite, the agile satellite can orient itself toward a target image and change its orientation toward another target area by changing its pitch, yaw and roll angles. This means non-agile satellites can image not only the areas directly underneath but also neighboring areas located on the proximity of the flight path. The difference between agile and non-agile satellite behavior is explained in FIGS. 8A and 8B. FIG. 8A shows the typical behavior of non-agile observation satellite 82. As the satellite moves along its path, it needs to select either target area 84 or target area 85 since it can only roll along its axis to image one of the target areas. In this specific case, satellite 82 images area 84 and forfeits area 85 due to lack of pitch capability during the imaging window 89. FIG. 8B shows the behavior of agile satellite 92 for the same case. Due to added pitch and yaw capability, the satellite can expand its viewing window by aiming at target 84 and then reaming at target 85 as soon as its finished with target 84. This way more target areas can be acquired during its flight.

Some technical terms needs to be explained using FIGS. 1 and 2 to explain the problem fully. In technical terms, Nadir Point 15 (Np) is called the point on the earth which is directly below the satellite at any given time during its orbit. Nadir Angle 16 (Na) is called the angle between the Satellite-Nadir point line (S-Np) and the point imaging camera is pointing at (S-Vp). In agile satellites the, the main imaging instrument can be used to image target areas that lay on the sides of the flight path as well as forward and backward targets with nadir angle +/−30°. Nadir angle of 30° degree gives possibility of imaging target areas that lay 260 km away (sideways) from the flight path of the satellite. Technically, it is possible to image targets with non-zero Nadir angle, but the quality of the image degrades as the Nadir angle increases. In other words, a target area imaged at Nadir angle 0° is preferred over an image which is imaged at Nadir angle 30°.

This "agile" capability of satellites opens up new possibilities for imaging target areas. Having capability to image areas that lay within +/−30° Nadir angle, not only on left and right of the path but also on forward and backward of the current nadir point of the satellite will present the possibility of additional target areas competing for the imaging window. Since the available time window to image is limited, it may not be possible to image all target areas. The preferences of the client are also important while deciding which target areas should be imaged. A target image with high Nadir angle may acceptable by some clients but not with some others. An image with intense cloud cover is not acceptable at all by most clients.

However, a target image with 10% cloud cover may be acceptable by some clients. Therefore, it is very important that observation satellite to use its imaging time wisely to acquire image which is acceptable by the clients. Since cloud cover is the most crucial factor in earth imaging, it is important to fulfill orders with acceptable level of cloud cover among the competing orders. Studies indicate that up to 80% of images acquired by commercial observation satellites are unusable due to excessive cloud cover [1]. If imaging a target area is skipped due to some reason, it is scheduled for acquisition at another round. As the deadline set up by client for image acquisition gets closer, the priority of that particular target increases. All these additional factors also need to be taken into consideration while deciding which target images should be acquired during the imaging window.

The main payload of earth observation satellite is the imaging equipment, which is an electronic imaging camera. Since ground speed of the satellite is very high, a linear array of light-sensitive sensors are typically used for scanning the ground image making use of the forward moving motion of the satellite. The width of the earth surface which can be scanned by the satellite in one scanning action is called "swath-width" which is shown by number 10 of FIG. 1. Direction of movement of satellite 11 is shown as 14. For a typical earth observation satellite, "swath-width" is about 17 kilometers. Any target area with width larger than that, has to be scanned by repetitive scanning actions. The duration of acquisition of a particular target is an important parameter to consider since it eventually affects the available time left for other neighboring target areas.

The main payload of the modern earth observation satellites is the imaging equipment, which is typically mounted longitudinally in the center of the satellite body. In contemporary designs, the camera is fixed rigidly to the satellite body. Because of this rigid connection, the satellite body needs to be pointed toward the target area in order to capture the image of a target. Reorientation of the body of the satellite is done by gyroscopic actuators or thrusters which takes certain amount of time. Imaging a particular target has consequences on imaging other targets due to reorientation time required. The amount of activity needed by the satellite to reorient itself to a new target is called "agility requirement" and it determines the reorientation time of the satellite. Reorientation time consumes the available imaging window of the target image. Therefore, reorientation time needed by the satellite is also an important parameter to take into consideration while deciding which targets should be acquire and in which sequence.

Earth observation satellites have limited connectivity with earth stations while revolving around the globe. Typically, observation satellite connects to a ground station on its way to receive list of locations to image and continued its journey until it reaches the target destination. Upon acquiring the image of the target, image data is stored in onboard memory of the satellite until satellite reaches and other ground station on its way and downloads the image file. On the average, a typical Earth Observation satellite has ground connectivity on the 10% of the time [2]. Due to limited connectivity, satellite has to make target priority decisions on its own without waiting for operator intervention.

Execution of Image Order Requests by Satellite Operators

It is essential to understand how the operators of an earth observation satellite currently handle the image ordering requests in order to appreciate the scale of the problem fully. Typical order processing starts by customer specifying coordinates of the target area using available online tools. Online software tools help to determine the coordinates, the area and the cost of acquisition. Customer also specifies acceptable nadir angle of acquisition, acceptable cloud cover level and deadline for acquisition. All this information is required by the satellite operator to determine the priorities among competing orders to determine which orders should be given priority under different circumstances. Cloud cover information over the target locations is a crucial piece of information which determines priorities. In current practice, cloud satellites provide the cloud cover information over target. Although up-to-date cloud cover information is received regularly, local cloud cover situation is known to change quickly [3]-[4]. Another problem with the cloud satellites is the low image resolution of the cloud satellites. Due to low resolution, it is difficult to predict the actual cloud cover situation over a specific target plot.

Taking into consideration the acceptable nadir angle of the client and the deadline for acquisition, the mission control prepares an image collection plan for the journey ahead and uploads information to the satellite as soon as the connectivity is established. Satellite operator uses the historical cloud cover as well as the most recent cloud images from cloud satellites to make an educated guess of which target plots are likely to present problems and makes use of this prediction in its image acquisition schedule [5]. Ultimately, it tries to avoid potentially cloud-covered target areas for the benefit of areas with clear sky overhead. As the satellite completes its journey, images of the target areas are acquired and stored internally until a ground station is reached where the image files are downloaded. Once the images are received by the mission control, they are checked for cloud cover condition to see if they are acceptable in terms of image quality. If the cloud cover level is found to be not acceptable, another image acquisition schedule for the same target area is scheduled by the mission control for the upcoming trips of the satellite. Orbital mechanics dictate the timing of the revisit of the exact same spot, which is in the order of few days.

Issues that Complicate the Image Acquisition Process

Several issues complicate the image acquisition process in the current practice. One of them is the cloud cover, which makes the acquisition process somewhat unpredictable. Even though the mission control acquires historical cloud cover information for the target area, actual cloud cover at the instant of acquisition is what really matters [6].

Another issue that complicates acquisition process has something to do with the proximity of target plots. If target plots have sufficiently separated acquisition time windows, there is not much concern for this issue. However, if the acquisition time windows for the targets are very close, there may not be enough time to reorient the satellite to the new target.

The complication arises from the fact that image acquisition instrument is installed within the body of the satellite rigidly. The whole body of the satellite has to be oriented toward the new target area. Considering the fact that satellite is moving toward the target with ground speed in excess of 27,000 km/h, and it takes time to reorient the body of the satellite for a new image acquisition, it is easy to understand that there is limited time to maneuver the satellite of each target. The problem is explained with the aid of FIG. 4. According to the figure, there are three target areas of acquisition which are marked as A, B and C. As satellite moves toward target A, satellite body is aligned with the target with the proper nadir angle. As soon as the edge of target A appears in the main imaging equipment, acquisition starts until satellite passes over the target A. Now target B is the next target in the image acquisition sequence. However, target B requires a different nadir angle and orientation in order to acquire its image properly. Yet there is another target area C, which is in close proximity to both A and B that is competing for acquisition during this window of acquisition time. Considering the enormous ground speed and close proximity of the target areas A, B and C, there is simply not enough time to reorient the satellite to all three target areas to acquire the image. As a result, mission control analyses the historical cloud cover data and makes an educated guess to skip area B in favor of area C. For this reason, mission control may instruct the satellite to acquire images for areas A and C but not B. Complication arises from the fact that, the historical cloud information is not always accurate. The clouds move in and out in a matter of minutes, which ruins the prediction. For the sake of argument, assume that target area C is covered by cloud recently and gives a poor image. In this case, we lost the opportunity to acquire both area C and area B.

Problems like these indicate that we need a better way of getting cloud cover information so that we can make a better decision about which targets should be favored over others. Relying on historical cloud cover information, results in very low yield ratio for quality images. According to [2], this approach results in loss of 80% of images taken by the satellite.

SUMMARY

The present invention is a system which makes it possible for an agile earth observation satellite to make autonomous decision about selecting on-coming targets. The system comprises some hardware and a decision mechanism that relies on the information coming from hardware.

The hardware part of the system comprises plurality of forward looking cameras to detect cloud cover on predetermined targets. The forward looking cameras are aimed toward different strips along the flight path defined by different nadir angles. Each one of the cameras determines the cloud cover condition over the possible target area in its corridor. These forward-looking preview cameras are installed on gimbals mechanism stabilized with gyroscopes to keep aiming along the flight path toward the flight direction. The cameras are strategically located on the satellite and not affected by the yaw, roll and pitch action of the satellite. A data processing unit processes the images that come from cameras and determines the cloud cover information above the target areas. The cloud cover information, client priority, acceptable cloud cover of client, acceptable nadir angle by the client as well as agility required for the new target are among the input data provided to the decision making unit of the invention which makes a decision in the available time window of few seconds. The output of the present invention is a prioritized list of approaching target areas and the sequence of acquisition along with the exact timing to start acquisition of each target.

The preferred embodiment of the invention comprises three forward looking cameras which are tilted 30° forward but each with different nadir angle to capture a different strip on earth. (FIG. 5.) The central forward looking camera images the central swath which spans from nadir angle −15° to +15°. Left forward looking camera scans the images from nadir angle −15° to −45° degrees. The right forward looking camera scans the swath from nadir angle +15° to +45° degrees. The preview cameras are mounted on a gyroscopically stabilized gimbals mount and they face forward in the direction of flight. Due to the stabilized gimbals mount, attitude of cameras are not affected by pitch, roll and yaw action of the satellite.

Image processing unit processes images to get cloud cover information over targets. The cloud cover over the target area is distinguished by high radiance values generated by the cloud cover. Decision making mechanism for the preferred embodiment of the invention is based on fuzzy logic decision-making system. Other decision making techniques known is the state of the art are also applicable methods for the decision making process. Fuzzy logic systems operates on fuzzy rules and membership functions for making a decision about which target area should be given priority in imaging. Fuzzy logic decision-making unit makes decisions and updates them as new targets appear and conditions change. The output of the fuzzy logic decision system is a prioritized list of targets that needs to be acquired in the specified sequence.

State of the Art in Cloud Detection

Using forward looking cameras to detect luminance level of oncoming areas is a technique used in satellite applications for different purposes. U.S. Pat. No. 5,353,055 is a patent granted for an image pickup system designed to measure radiance level of the oncoming path for the purpose of adjusting sensitivity of the imaging camera. Said invention provides radiance level information of the coming areas so that the sensitivity of the main imaging camera can be adjusted beforehand to take advantage of the full dynamic range of the camera. The particular invention uses a forward looking camera rigidly fixed on the satellite looking forward at exactly the same strip which will be viewed by the main imaging camera. This apparatus is not designed for determination of cloud cover of selective areas, but to provide radiance level information of oncoming areas continuously for continuous adjustment of sensitivity threshold of the main imaging camera.

There are several other cloud related patents and application which should be mentioned at this stage. DE 10 2004 024595 B3 is a document which discloses an invention which recovers clean images from cloud covered images by overlapping and manipulating images taken at different times using image manipulation techniques.

Another patent document, DE 10 2005 0101155 A1, discloses a method for previewing cloud information over target areas by repetitive flying over the target areas to get preview of cloud cover. As the satellite flies over a path, which is not directly overhead the target area yet, the target area becomes visible on the side at a high nadir angle. It uses its main imaging instrument to get a preview of the cloud cover of target area by rolling satellite toward the target. The satellite gets a preview of the cloud cover over the target area this way. When it makes its next rotation on earth and approached to the target head on, it uses the cloud cover information for the appropriate decision-making. Although this is a viable method of cloud cover detection, there is time difference of approximately 90 minutes between preview action and the actual imaging time when the satellite comes over the target area. Cloud cover situation is known to be very dynamic and changes rapidly which may make the information gained in the preview run useless.

Decision making process in agile satellites is considered a difficult problem to tackle and considerable academic effort spent for developing an acceptable solution. One such study by Beaumet et al. in an article titled "Decision-Making onboard an Autonomous Agile Earth-Observing Satellite", In Proc. of ICAPS-2008, the Eighteenth International Conference on Automated Planning and Scheduling, 2008. In this article, the author suggest a mechanism for getting cloud cover information about oncoming target areas by tilting the satellite body forward in such a way to let main imaging instrument to look forward 30° toward oncoming target areas to get cloud cover information in advance. The advantage of this technique is the use of existing imaging instrument to detect the presence of cloud cover; hence, there is no need for any extra hardware. Authors further suggest use of "greedy search algorithm" for the decision making process. Although using the main imaging camera is a viable method for detecting cloud presence over the target areas, the energy consumption of the repetitive tilt action of the satellite to get cloud preview of target causes concern. Another concern is the repeated maneuvering of satellite for such simple task which eventually endangering the service life of the satellite.

The present invention is a solution which uses reasonable hardware to get up-to-date cloud preview and fuzzy rules for priority determination. The forward looking preview cameras used for cloud presence detection are relatively low resolution imaging cameras which have small mass and volume compared to main imaging instrument. Using plurality of forward-looking cameras make it easy to preview target cloud cover information from different nadir angle strips simultaneously and efficiently. Position stabilized gimbaled mount makes cameras point in the direction of flight and not affected by movements of the satellite. This makes image processing process relatively easy and more reliable.

LITERATURES REFERENCED IN THE TEXT

[1] A. J. Tatem, S. J. Goetz, and S. I. Hay, "Fifty Years of Earth Observation Satellites", Am Sci.; Vol. 96, Issue 5, pp. 390-398, September 2008.
[2] G. Beaumet, G. Verfaillie and M. Charmeau, "Decision-Making on-board an Autonomous Agile Earth-Observing Satellite", In Proc. of ICAPS-2008, the Eighteenth International Conference on Automated Planning and Scheduling, 2008.
[3] P. Bissolli, "Construction of a cloud cover reference climatology using satellite and in situ data for the climate monitoring programme SAT-KLIM", Proceedings of the 2003 EUMETSAT Meteorological Satellite Conference Weimar, Germany, 2003
[4] U. Maier, H. Nitsche, "SAT-KLIM. Using Satellite Derived Cloud Products for Operational Climate Monitoring", Proceedings of EUMETSAT Meteorological Satellite Conference, 2009. Available at: http://www.eumetsat-int/idcplg?IdcService=GET_FILE&dDocName=PDF_CONF_P_S4_12_NITSCHE_P&RevisionSelection Method=LatestReleased.
[5] WorldView-1 Product.quick reference guide. Version 2.1, Jul. 20, 2009, available at: www.digitalglobe. com/ . . . /file.php/ . . . /WV-1_Product_QR_Guide.pdf
[6] Weather Source, Historical Weather Data Products and Services, Available at: http://weather-source.com/prodservices.html

BRIEF DESCRIPTION OF DRAWINGS

FIG. 8A shows the image acquisition process of a non-agile satellite.
FIG. 8B shows the image acquisition process of an agile satellite.

DESCRIPTION

Figure 2:
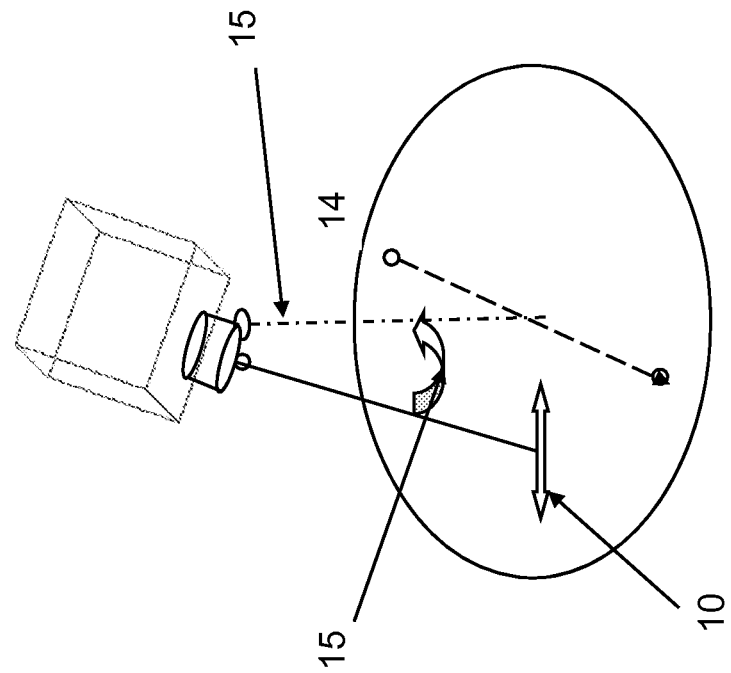
FIG. 2 shows Nadir angle and Nadir point of an earth observation satellite.
Figure 1:
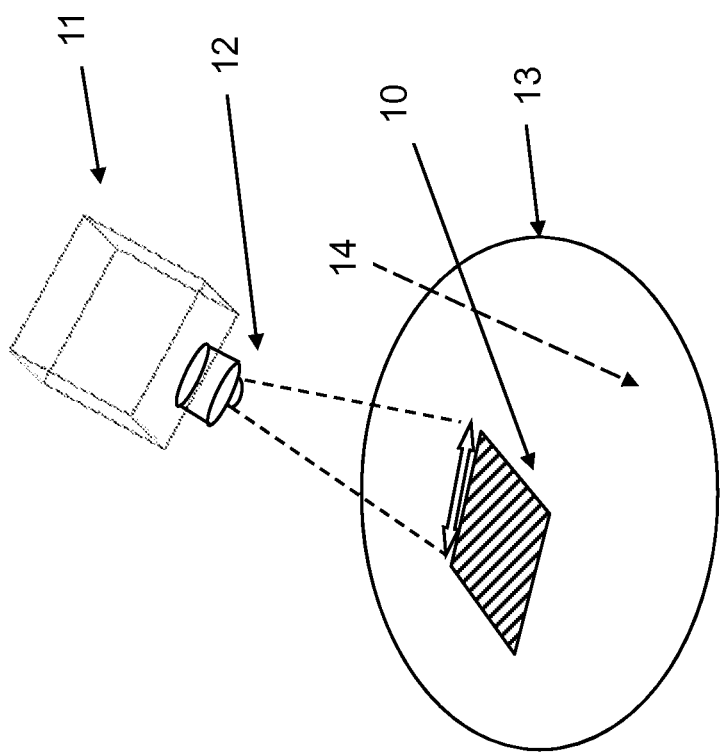
FIG. 1 shows the swath width of an earth observation satellite.
Figure 3:
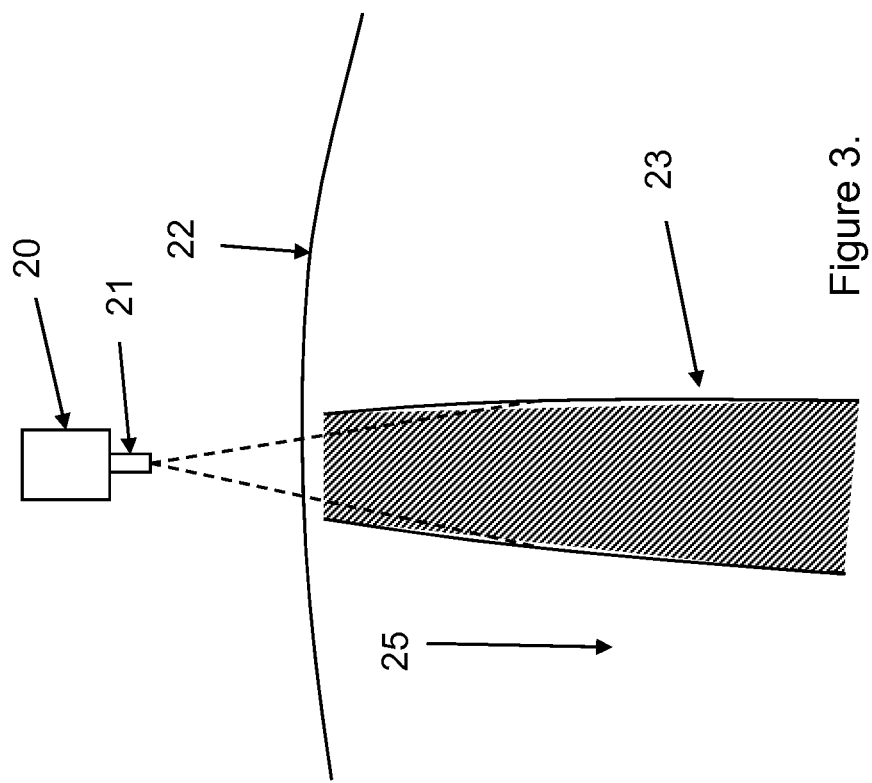
FIG. 3 shows the swath width of a non-agile satellite.

The operation of the present invention will now be described using figures. FIGS. 1 and 2 are used for describing Nadir point, Nadir angle concepts which is central to present invention. Number 14 shows the direction of movement of satellite, number 10 shows the swath width, number 16 shows the nadir angle and number 15 shows the nadir point. FIG. 3 shows the image acquisition process of a typical Earth observation satellite. In this figure satellite 20 moves in the direction of 25 and by using its camera 21 acquires image of a strip 23 from earth 22.

Figure 4:
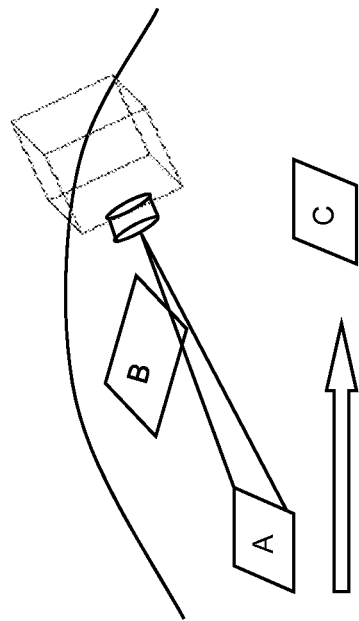
FIG. 4 shows the dilemma of operators when there are more than one target area in close proximity.

FIG. 4 shows a typical dilemma of operators where there are three target areas labeled as A, B and C, which requires image acquisition. Due to close proximity of the target areas, the satellite has time to image only one or two but not for all three areas. It is important to select target area with clear sky overhead.

Figure 5:
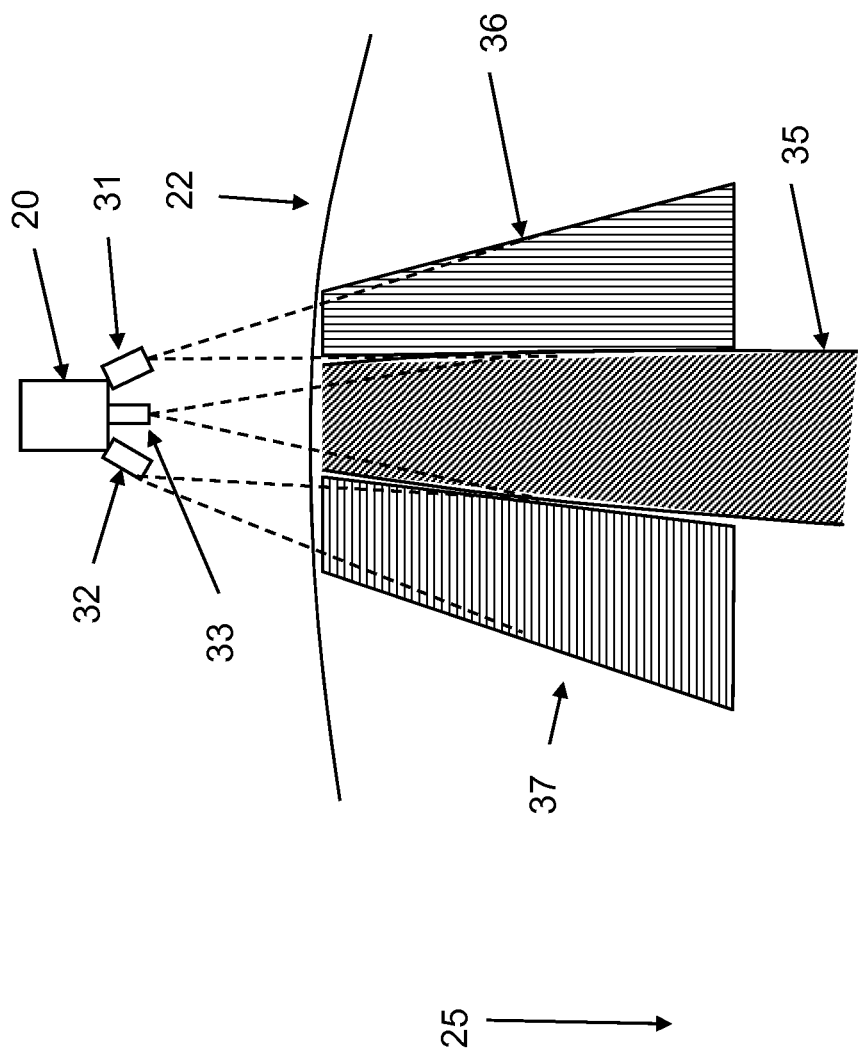
FIG. 5 shows the preview cameras of the preferred embodiment.
Figure 6:
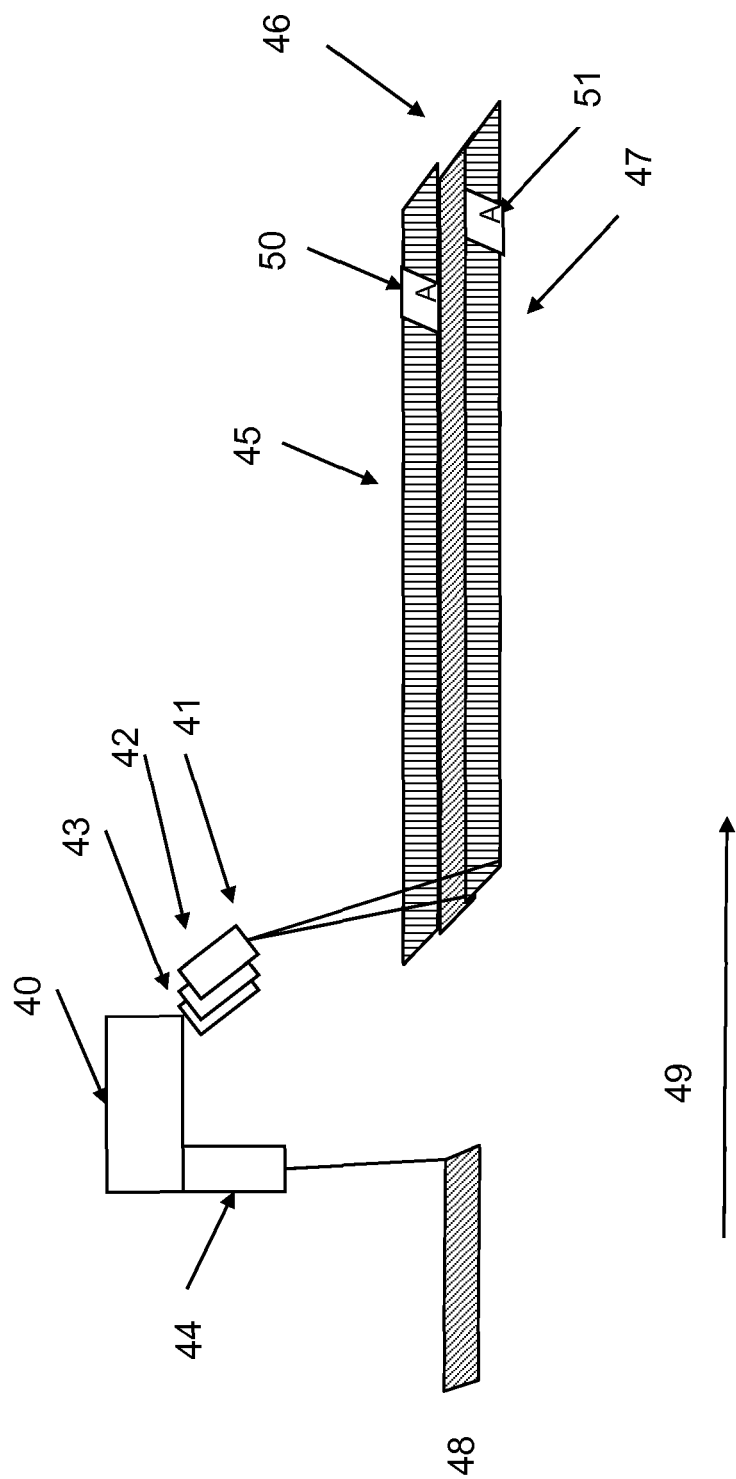
FIG. 6 shows the side view of preview cameras of the preferred embodiment.

FIG. 5 shows the detailed view of preview cameras. In a preferred embodiment of the design, there are three preview cameras, 31, 32, and 33 attached to the body of the Satellite 20. Preview camera 33 views the strip where the nadir angle ranges from −15° to +15° which is marked as 35. Preview camera 31 views the strip where the nadir angle ranges from −15° to −40° which is marked as 36. Preview camera 33 views the strip where the nadir angle ranges from +15° to +40° which is marked as 37. FIG. 6 shows the sideway view of the preview cameras shown in FIG. 5. In this figure, the main imaging camera of the satellite 40 is labeled as 44. Preview cameras 41, 42, 43 are tilted 30° forward toward the direction of flight to view cloud cover on approaching target areas 50 and 51. Each preview camera is responsible for imaging target areas that fall into their strip. Camera 41 images strip 47 and determine cloud cover of target areas that are located on that strip. The same way, the camera 42 is responsible for strip 46 and the camera 43 is responsible for targets along the strip 45. Satellite 40 is assumed to be moving in the direction of 49.

Figures 7A, 7B:
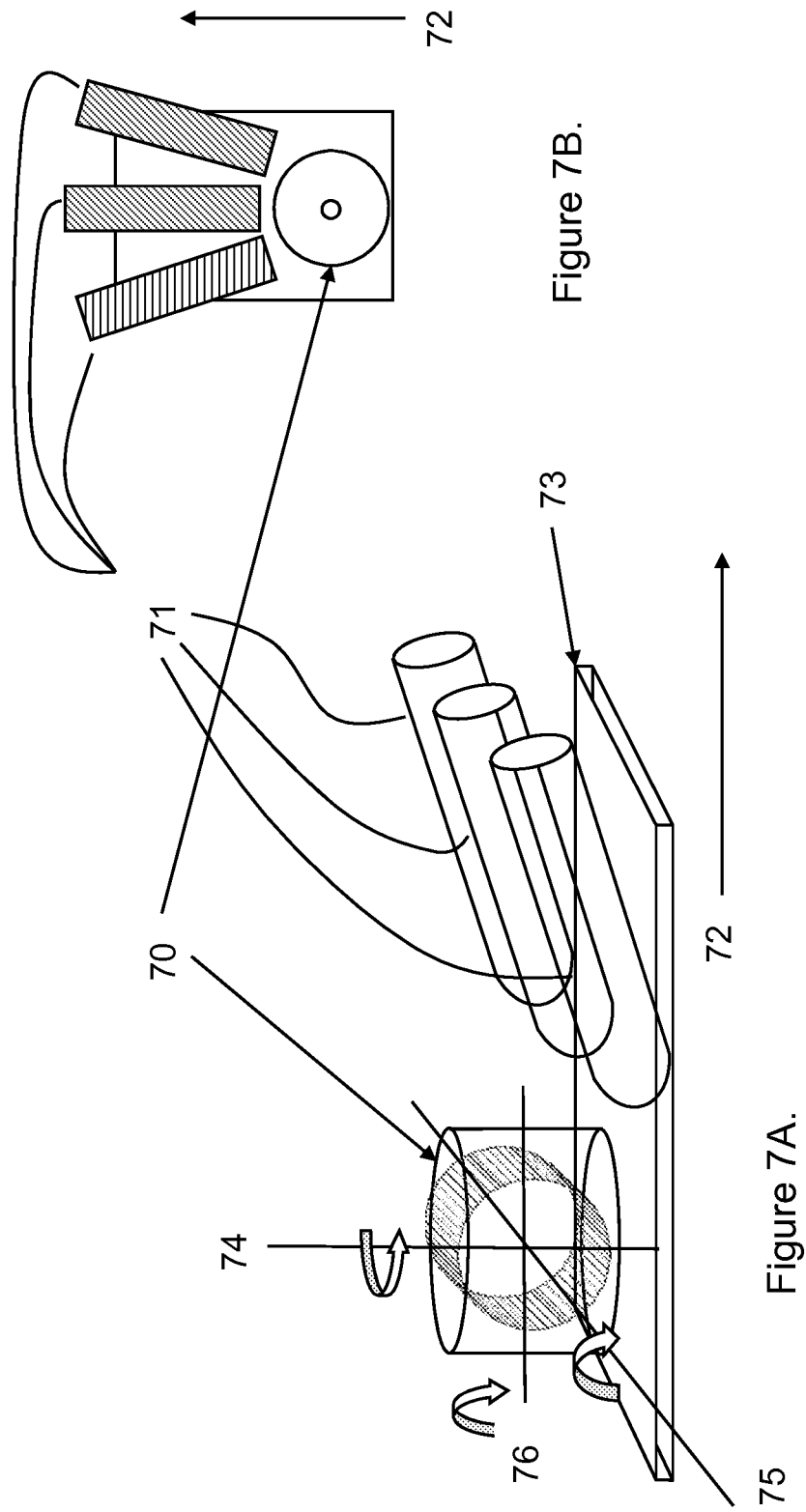
FIGS. 7A and 7B show the gimbaled and stabilized structure of the preview cameras.

FIGS. 7A and 7B show the perspective view of cloud preview cameras and the way they are attached to the satellite. The preview cameras 71 are mounted on a base plate 73 which is gimbaled and gyroscopically stabilized by mechanism inside 70. Due to the stabilization arrangement contained in 70, the base plate and the cameras always face the moving direction 72 and it is free to move along axis 74, 75 and 76 in order not to be affected by the yaw, roll, and pitch action of the satellite.

The difference between agile and non-agile satellite behavior is explained with the aid of FIGS. 8A and 8B. FIG. 8A shows the typical behavior of non-agile observation satellite 82. As the satellite 82 moves along its path 90, when it reaches the acquisition time window 89, it needs to select either target area 84 or target area 85. Non-agile satellites can only roll along its axis to image one of the target areas. In this specific case, satellite 82 images target area 84 and forfeits target area 85 due to lack of time in the acquisition window 89. FIG. 8B shows the behavior of an agile satellite 92 for the same earth observation case. Due to added pitch and yaw capability, the satellite can expand its viewing window by aiming at target 84 during time window 89 and then reaming at target 85 as soon as it is finished with target 84. This way more target areas can be acquired during its flight. In FIG. 8B this agile capability is used to image all target areas.

Figure 9:
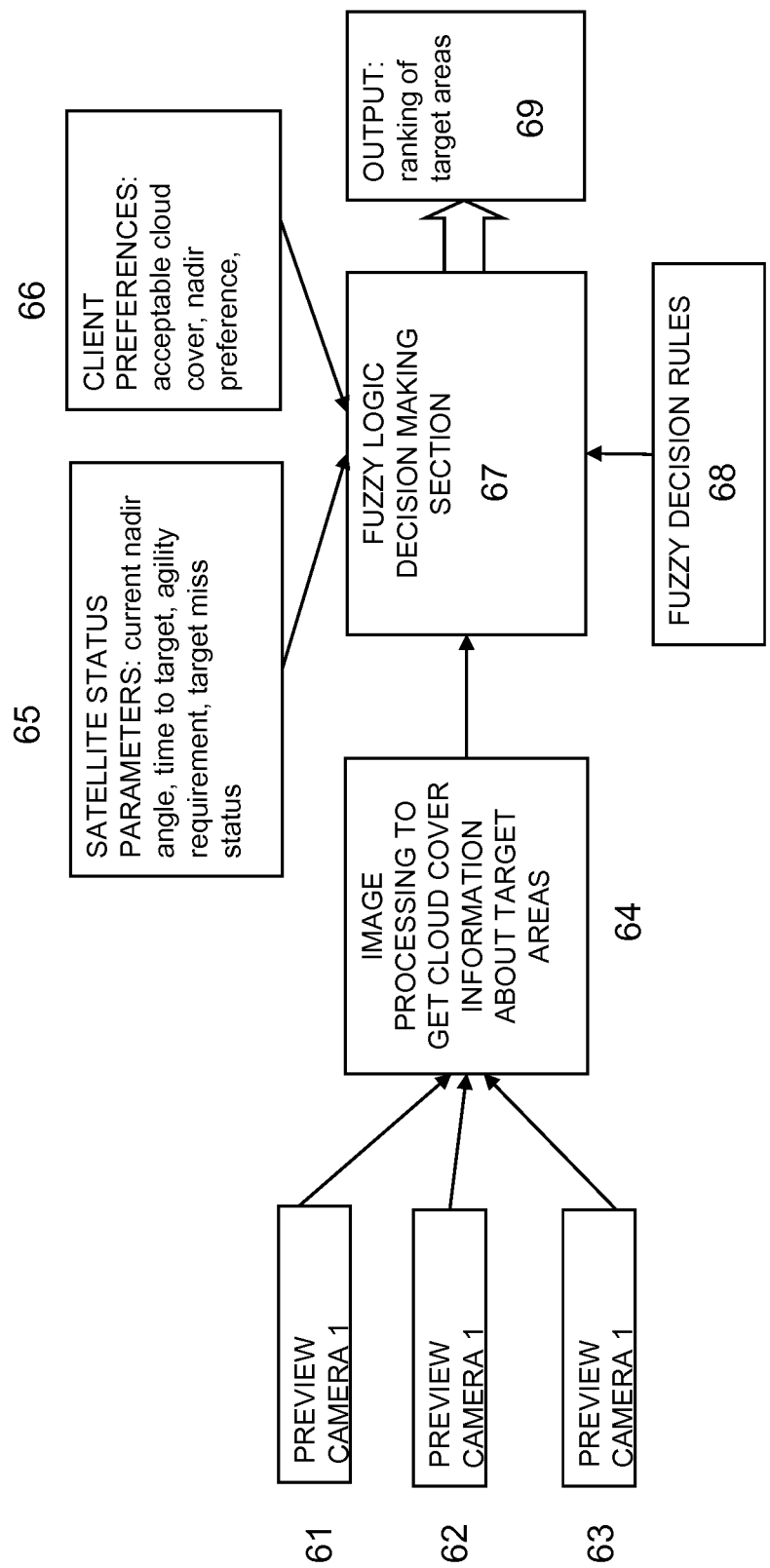
FIG. 9 shows the block diagram of the fuzzy logic decision making process.

However, it is clear that the scheduling when to start imaging target areas 84, 85, 86, 87 and 88 is crucially important. Additionally, factors like urgency of the image acquisition request, acceptable level of cloud cover of client, nadir preference of the client, how many times the target area has been skipped before are important parameters, which will affect the priority of the target area. FIG. 9 shows the decision mechanism of the present invention. Preview cameras 61, 62, 63 provide the image information image processing unit shown in 64 to extract the cloud cover information about the on-coming target areas. This information is provided to the fuzzy logic decision mechanism 67 which is typically a software running on computer. Fuzzy logic system accept status inputs 65 from the satellite regarding the current nadir angle, nadir point, available times for a specific oncoming target areas, the amount of agility required to image a specific target area are provided to the fuzzy logic decision making unit. Client preferences (block 66), like acceptable cloud cover level by the client, acceptable Nadir angle by the client are also provided to the decision making system 67. Another set of inputs to the fuzzy logic system 67 are fuzzy rule set (block 68) which describes priorities for the system. A typical subset of fuzzy rules for a preferred embodiment shown in 68 are as follows;

If the approaching target is "agility wise" manageable and target image quality in terms of cloud cover is good than we should acquire the image.

If the approaching target is critical in terms of agility and cloud cover quality is acceptable and if the Miss Status of the target is high, than we should acquire the image.

If either the agility requirement or cloud cover is not favorable than we should not acquire image.

The output 69 of the fuzzy logic system is a prioritized list of targets and the acquire sequence of when to start acquisition of each one the target areas. This list is delivered to the satellite controller for execution of appropriate actions.

The generation of fuzzy rules, fuzzy membership functions and defuzzification processes are all part of designing fuzzy logic systems and it is well known by the professionals who practice this art.

The invention claimed is:

1. A decision making apparatus mounted on a craft sailing along an orbit to determine image acquisition priority of target areas approaching the craft, said apparatus comprising:
   a control imaging system including one or more control imaging devices separate from a main imaging instrument of the craft, at least one control imaging device looking at an angle forward toward a direction of flight of the craft, and at an angle sideways from the direction of flight, to cover an area at a nadir angle greater than 15 degrees but less than 45 degrees sideways from the direction of flight, to capture images that provide a preview of cloud coverage over target areas approaching the craft due to flight of the craft, before a target area is within imaging range of the main imaging instrument of the craft, the control imaging system stabilized to look at the angle forward and at the angle sideways from the direction of flight independent of any yaw, roll and pitch action of the craft used to direct the main imaging instrument of the craft;
   a data processing section to extract cloud cover information over the target areas from the images coming from the control imaging system; and
   a decision making section that processes data coming from the data processing section together with data reflecting current status of the craft, shape and location of the target areas, preferences of a client about the target areas, an acquisition attempt history of the target areas, and decision making rules, to determine the image acquisition priority of target areas.

2. The apparatus of claim 1, wherein the control imaging system comprises a single control imaging device.

3. The apparatus of claim 1,
   wherein the control imaging system comprises a plurality of control imaging devices including control imaging devices looking at an angle forward toward the direction of flight, and at an angle sideways from the direction of flight, to cover an area at a nadir angle greater than 15 degrees but less than 45 degrees sideways from the direction of flight, to capture the images that provide a preview of cloud coverage over target areas approaching the craft due to flight of the craft, before the target areas are within imaging range of the main imaging instrument of the craft, and
   wherein the data processing section extracts the cloud cover information over the target areas from the images coming from the control imaging devices in parallel.

4. The apparatus of claim 3, wherein each one of the plurality of control imaging devices is aimed toward different strips of the surface that the craft is sailing above, wherein each strip is adjacent to the strip of a next control imaging device, wherein there is no overlap between the strips of the surface.

5. The apparatus of claim 3, wherein a scope of vision of the plurality of control imaging devices together is larger than a scope of vision of the main imaging instrument of the craft.

6. A decision-making method for a craft sailing along an orbit to determine image acquisition priority of target areas approaching to the craft by processing data, the processing data comprising:
   receiving data coming from a control imaging system including one or more control imaging devices, at least one control imaging device looking at an angle forward toward a direction of flight of the craft, and at an angle sideways from the direction of flight, to cover an area at a nadir angle greater than 15 degrees but less than 45 degrees sideways from the direction of flight, the received data from the control imaging system regarding cloud coverage of target areas approaching the craft due to flight of the craft, the control imaging system stabilized to look at the angle forward and at the angle sideways from the direction of flight independent of any yaw, roll and pitch action of the craft used to direct a main imaging instrument of the craft;
   receiving a preference of clients about urgency of target areas approaching for image acquisition;
   receiving an acquisition attempt history of the target areas reflecting an unsuccessful number of image acquisition attempts for each target area;
   receiving data reflecting nadir angle of the satellite during image acquisition of the each target area in case target image acquisition is attempted; and
   applying a set of decision rules that processes all the data and recommends which target area images should be acquired in which sequence, and which target area images should be forfeited, while the satellite is sailing above the target areas, in such a way as to produce an image acquisition combination.

7. The method of claim 6, wherein the decision-making method further comprises generating a prioritized list of target areas approaching to the craft and recommending that an on-board controller of the satellite attempt image acquisition of target areas starting with highest priority target areas and acquire images of as many of the target areas as possible according to their respective priorities during a time window in which the satellite is over the target areas.

8. The method of claim 6, wherein the receiving data coming from the control imaging system comprises receiving data coming from a plurality of control imaging devices.

* * * * *